Jan. 16, 1962  YOSHINOBU SAKAKI  3,017,538
ILLUMINATING DEVICE FOR MOTION PICTURE PROJECTING
Filed March 10, 1959  2 Sheets-Sheet 1

Jan. 16, 1962  YOSHINOBU SAKAKI  3,017,538
ILLUMINATING DEVICE FOR MOTION PICTURE PROJECTING
Filed March 10, 1959  2 Sheets-Sheet 2

United States Patent Office 3,017,538
Patented Jan. 16, 1962

3,017,538
ILLUMINATING DEVICE FOR MOTION
PICTURE PROJECTING
Yoshinobu Sakaki, 5 Kikusakacho 1-chome, Chikusa-ku,
Nagoya, Japan
Filed Mar. 10, 1959, Ser. No. 798,558
1 Claim. (Cl. 315—241)

This invention relates to a motion-picture projector, and more particularly to a light source device for use in such a projector.

Since a xenon gas arc lamp originally developed by P. Schulz can establish therein an arc having high brightness and a spectral energy distribution in the visible spectrum resembling sunshine and a color temperature compatible with light sources previously used in motion-picture projectors it is increasingly employed as a light source in a portable projector. Further, it has such characteristics that the light output from the arc can be pulsed in such a manner that the lamp acts as both a light source and a shutter.

In order to operate the xenon arc lamp, it may first be struck with voltage pulses of the order of ten thousand volts to initiate an arc discharge therein and successively supplied with a normal operating voltage at a lower level to maintain that discharge for emitting light from the lamp. When the weak discharge thus produced is being converted into a strong normal discharge, a voltage having a magnitude equal to several times the magnitude of the normal operating voltage is necessarily applied to the lamp with a product of magnitudes of voltage applied and current flowing through the same substantially equal to that required to maintain the normal operation thereof whereby the xenon filling the lamp will be actively ionized.

An object of the present invention is to provide a light source device for the use in a portable motion-picture projector including a mechanism ensuring that a non-professional type of operator can easily operate a xenon arc lamp equipped in the projector in the manner described above.

Another object of the invention is to provide a light source device for use in a portable motion-picture projector employing a xenon arc lamp which produces periodically a light output in accordance with a pulsed direct current voltage applied thereto whereby a film advancing operation can be effected during a period of time that the light output of the lamp is being interrupted, without the necessity of using a mechanical shutter.

The invention will become more readily apparent from the following detailed description of an exemplified embodiment thereof illustrated in the accompanying drawings in which.

Before the invention will be explained in detail, a description will now be made as to a portable motion-picture projector by referring to FIG. 1.

Figure 1:
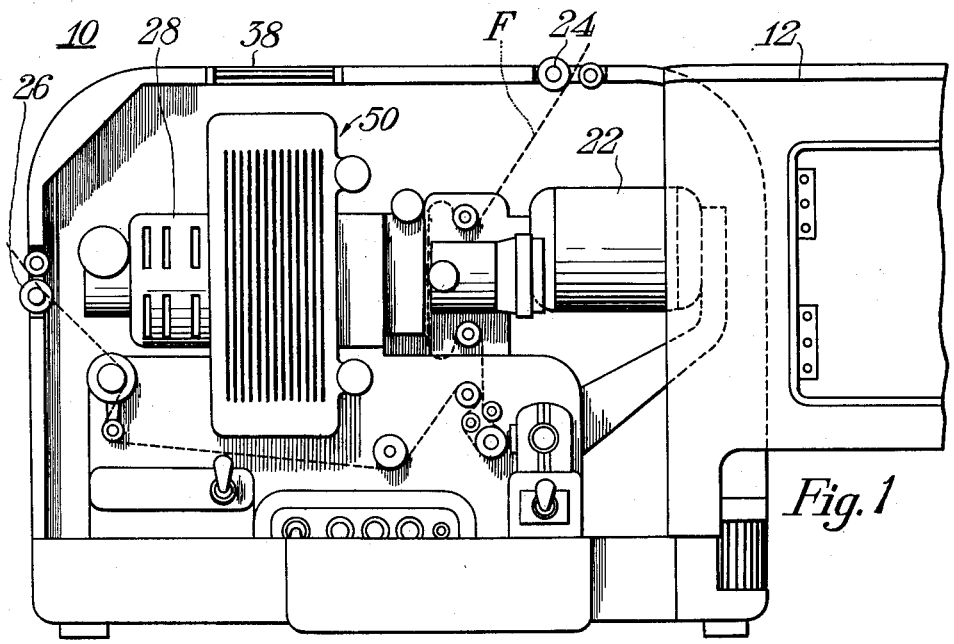
FIG. 1 is an elevation view of a portable motion picture projector with the side cover removed and to which the invention is applied.

A portable motion-picture projector generally designated 10 in FIG. 1 comprises a side cover 12 hinged to the body thereof and a synchronous motor 22 provided on the front portion thereof for intermittently driving the motion-picture film F in a conventional manner along a path from a film supply reel, not shown, through a guide roller 24 provided on the top surface of the projector 10, a plurality of rollers and sprocket wheels disposed as shown within the body of the projector and thence through a guide roller 26 provided on the rear wall of the body 10 to a take-up reel, not shown. Adjacent to a light projecting assemblage 50 is disposed an electrical motor 28 for feeding cooling air into the lamp assemblage and driving the film take-up reel. The motors 22 and 28 can be energized by a commercial power line through a socket, not shown, disposed on the rear wall of the projector body 10. It will be understood that a small cover for closing a projection window (not shown) is hinged to the body on the front wall and can be dropped away to pass light from the lamp unit assemblage 50 through the projection window to a projection screen (not shown).

Figure 2:
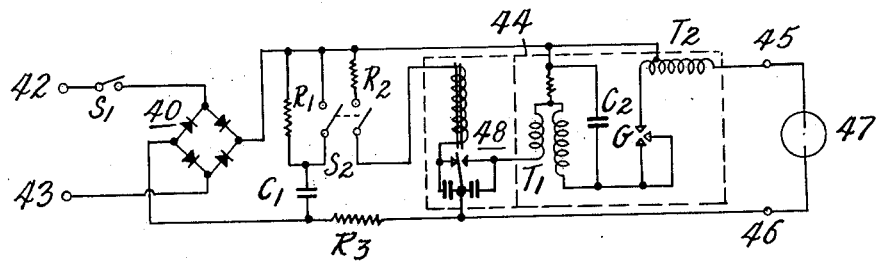
FIG. 2 is a schematic circuit diagram of a light source device for the use in a portable motion picture projector embodying the teaching of the invention.

Referring now in detail to FIG. 2, there is illustrated a schematic circuit diagram of a light source device for the use in a portable motion-picture projector embodying the teaching of the invention. A full-wave rectifier 40 is supplied with an alternating current from a suitable commercial power line (not shown) through a pair of input terminals 42, 43 and a switch $S_1$. The alternating current supplied may have, for example, a frequency of 60 cycles per second. Although the rectifier 40 is shown as being of a bridge type comprising four dry rectifiers such as selenium rectifiers any desired type of full-wave rectifier may be used to produce an electric power sufficient to operate a xenon arc lamp which will be explained hereafter. A resistor $R_1$ and a capacitor $C_1$ connected in series to each other are connected across the output of the rectifier 40. A single throw two pole switch $S_2$ is provided for short circuiting the resistor $R_1$ and simultaneously coupling the output from the rectifier 40 through a current-limiting resistor $R_2$ to a circuit enclosed with a dotted area 44. The circuit 44 will be explained in detail hereafter. Here, it is stated that the circuit 44 generates a high voltage pulse serving to initiate an arc in the xenon arc lamp. As seen in FIG. 2, one arm of the switch $S_2$ is connected to the junction of the resistor $R_1$ and the capacitor $C_1$ and the associated contact thereof connected to that end of the resistor $R_1$ remote from the capacitor $C_1$. The other arm of the switch $S_2$ is connected to the input to the circuit 44 and the associated contact thereof connected to the resistor $R_2$ having its end connected to said end of the resistor $R_1$. The circuit 44 is returned back to the rectifier 40 through a stabilizing resistor $R_3$ having its end connected to that end of the capacitor $C_1$ remote from the resistor $R_1$.

With the arrangement illustrated, the output from the rectifier 40 is coupled to a pair of output terminals 45 and 46 through a component in the circuit 44 and the resistor $R_3$. However, that end of the resistor $R_2$ remote from the switch $S_2$ may be connected directly to the output terminals 45. A xenon arc lamp designated 47 is connected between the output terminals 45 and 46.

The operation of the device described above is as follows:

With a commercial power line connected to the input terminals 42 and 43, the closure of the switch $S_1$ causes the energization of the full-wave rectifier 40. The rectifier 40 rectifies the supplied alternating current (see FIG. 4) to produce a pulsating direct current voltage at the output thereof. If the alternating current has, for example a frequency of 60 cycles per second the output from the rectifier has a rate of repetition of 120 cycles per second. The rectified, pulsating D.C. voltage charges the capacitor $C_1$ through the resistor $R_1$. The single throw two pole switch $S_1$ can now be closed to energize the circuit 44 for generating a high voltage pulse.

The circuit 44 shown in FIG. 2 comprises essentially a pulse generator of the vibration type generally designated 48, a step-up autotransformer $T_1$, a capacitor $C_2$, a spark gap of the three electrode type generally designated G and a pulse transformer $T_2$. These components in the circuit 44 will not be explained in detail here because they are well known in the art.

With the switch $S_2$ closed, the resistor $R_1$ is shortcircuited whereby the capacitor $C_1$ is coupled directly with the output of the rectifier 40. Accordingly, the output from the rectifier is considerably smoothed and higher in magnitude. At the same time, the considerably smoothed D.C. output is applied through the current-limiting resistor $R_2$ to the pulse generator 48 which, in turn, generates a pulse having a rate of repetition as determined by the natural frequency of the same in the known manner. The pulse thus generated is passed to the step-up autotransformer $T_1$ to be increased in amplitude and then supplied to the capacitor $C_2$. After a voltage across the capacitor $C_2$ will have reached a predetermined magnitude, the capacitor is discharged through the spark gap G. The current flowing through the gap is supplied to the output terminals 45 and 46 through the pulse transformer $T_2$. The voltage appearing across the output terminals is such that it can initiate or produce a gas discharge in the xenon arc lamp 47 connected to those terminals. Namely, the voltage has a peak of the order of ten thousand volts.

Since a xenon arc lamp as used in a motion-picture projector is well known it is not explained in more detail herein. The light source device of the invention used a xenon arc lamp of XL-500 type made by Tokyo-Shibaura-Denki Kabushikikaisha (The Tokyo-Shibaura Electric Company Limited). The lamp used has the following characteristics:

| | |
|---|---|
| Watts in lamp | 500 |
| Operating voltage _____volts__ | 23 |
| Operating current _____amperes__ | 22 |
| Horizontal luminous intensity _____candles__ | 1,210 |
| Total luminous flux _____lumens__ | 13,500 |
| Efficiency of lamp _____lumens/Watt__ | 27 |
| Supplied D.C. voltage _____volts__ | >65 |
| Total length _____mm__ | 190 |
| Diameter of lamp envelope _____mm__ | 30 |
| Arc length _____mm__ | 4 |
| Base for lamp | Special |
| Used position | Vertical |

While the xenon arc lamp 47 is being supplied with the high voltage pulse from the circuit 44, it is also impressed with the rectified voltage output from the rectifier 40. Therefore, the gas discharge which has been produced in the lamp 47 by means of the high voltage pulse is additionally enhanced and sustained resulting in the gradual increase in the discharging current flowing through the lamp.

This increase in the discharging current causes the increase in a voltage drop across the stabilizing resistor $R_3$ thereby to automatically decrease the discharging voltage applied to the xenon arc lamp until the same will be put into its normal operating condition. Thus, the lamp continues to emit light due to the gas discharge established therein.

On the other hand, as the voltage impressed across the xenon arc lamp is gradually reduced the circuit 44 is supplied with decreasing D.C. voltage until it will stop to generate the high voltage pulse.

Shortly after the xenon arc lamp 47 has begun to be operated in its normal condition, or after ten seconds beginning on closing of the switch $S_1$, the switch $S_2$ will be opened. This disconnects the circuit 44 from the rectifier 40 and causes the resistor $R_1$ to be operative. Due to the action of the resistor $R_1$ operatively connected in series to the capacitor $C_1$, the rectifier 44 supplies to the xenon arc lamp the pulsating D.C. voltage having a magnitude less than that obtained when the resistor $R_1$ is shortcircuited, but sufficient to sustain the gas discharge within the lamp. Thus, the lamp produces a pulsed light output in accordance with the pulsating D.C. voltage applied thereto.

If the capacitor $C_1$ would be connected directly across the output of the rectifier 40, the closure of the switch $S_1$ will cause a capacitor-charging current to be excessively drawn from the rectifier resulting in the possibility of breaking down the capacitor. According to the invention, the switch $S_1$ is closed with the single throw two pole switch $S_2$ open so that the capacitor is gradually charged with the rectified voltage from the rectifier through the resistor $R_1$ thereby to eliminate the above stated possibility. Then the switch $S_2$ is closed to shortcircuit the resistor $R_1$ to connect the capacitor $C_1$ directly across the output of the rectifier, and simultaneously to connect the pulse generating circuit 44 to the rectifier. The capacitor $C_1$, can now supply to the circuit 44 and the xenon arc lamp 47 D.C. voltage possibly smoothed and higher in its average value, in order to initiate the gas discharge within the lamp and also to enhance the gas discharge thus initiated, at the beginning of the operation of the lamp. As described previously, the switch $S_2$ is again opened to operatively connect the resistor $R_1$ in series to the capacitor thereby to supply the xenon arc lamp with the desired pulsating D.C. voltage.

It will be seen that the capacitor $C_1$ has a relatively higher current flowing therethrough only for a short period of time at the beginning of the lamp operation and is protected against heating. Also it is possible to satisfactorily use even any capacitor having an electric capacity insufficient for charging and discharging current flow appearing on starting the lamp. Therefore, the light source device can be made in the small-sized, compact form.

Figure 3:
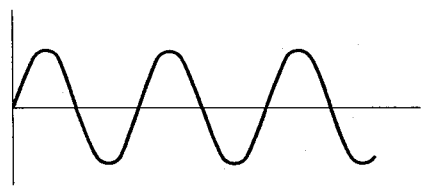
FIG. 3 is a diagram illustrative of a waveform of alternating current used with the device illustrated in FIG. 1.
Figure 4:
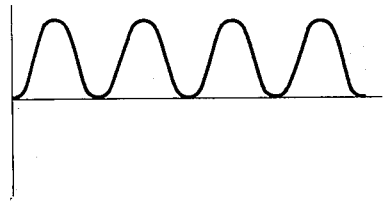
FIG. 4 is a diagram of a waveform of alternating-current voltage applied to a xenon arc lamp under its normal operation.
Figure 5:
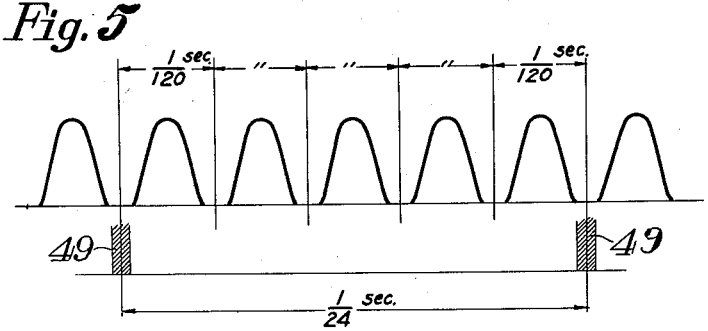
FIG. 5 is a diagram illustrative of a graphical representation of light pulses from the xenon arc lamp circuit according to the invention illustrating periods of film advancement and non-advancement or projection.

In operation, as the rectifier 44 is supplied with a waveform of alternating current as shown by a curve in FIG. 3, the current flow through the xenon arc lamp is pulsed as shown by a curve in FIG. 4. Then the lamp emits visible light in the form of pulse with time interval between two adjacent pulses for which the light is not emitted from the lamp as illustrated in FIG. 5. Due to the use of the full-wave rectifier, the light output from the xenon lamp has a rate of repetition equal to twice the frequency of the alternating current supplied to the rectifier.

If a 60 cycle power line is used, the xenon arc lamp may emit light at a rate of 120 light pulses per second. On the other hand, a 16 mm. motion-picture film is normally driven at the sound speed of 24 frames per second. A synchronous motor driving a projector from the same 60 cycle power line will always synchronize film advancement with the xenon light "dark-out" periods. Therefore, the use of the rate of 120 light pulses per second gives five light interruptions per frame of such a film resulting in complete flicker-free projection. As shown in FIG. 5, the film advancement function is accomplished for the xenon-arc "dark out" period represented by hatched areas 49. This eliminates the necessity of using a mechanical shutter for light interruption.

If a 50 cycle power line is used the film advancement may be accomplished every four interruptions of xenon light with a 16 mm. motion-picture film moved at a speed of 25 frames per second.

Synchronization of film advancement with light interruption may be finely adjusted as by angularly displacing the field windings of the synchronous motor as by rotating an adjusting knob, not shown, on the outside of the projector.

A period of time required to advance or take-up the motion-picture film may be shortened by suitably designing a mechanism for advancing the film. Further, if a saturable reactor is connected serially in the circuit for energizing the xenon arc lamp, the xenon-arc "darkout" period may be larger. Therefore, the film advancement period can be prevented from overlapping the xenon-arc "bright" period.

With a 60 cycle 100 volt power line and a xenon arc lamp of the type mentioned previously, the figures of the resistors and capacitors shown in FIG. 2 are illustrated by way of example in the following table.

| | | | | |
|---|---|---|---|---|
| $R_1$ | ohms | 50 | $C_1$ microfarads | 1000 |
| $R_2$ | do | 3000 | $C_2$ do | 800 |
| $R_3$ | do | 0.8 | | |

The time constant of the resistor $R_1$ and capacitor $C_1$ is preferably greater than $4 \times 10^{-2}$ seconds. The resistances $R_1$ and $R_2$ may be varied from 40 to 100 ohms and from 0.5 to 1 ohm respectively. The capacities of the capacitors $C_1$ and $C_2$ may range from 500 to 3000 microfarads and from 500 to 1000 micromicrofarads respectively.

Since the invention utilizes a direct current voltage the xenon arc lamp can be lighted more easily as compared with the use of an alternating current voltage.

The invention has an advantage that a mechanical shutter is eliminated. However, an auxiliary mechanical shutter, may be provided for intermittently interrupting the pulsed light output from the xenon arc lamp in such a way as to cut off the both side portions of the output thereby to shorten the xenon-arc "bright" period.

While the invention has been described in conjunction with an embodiment thereof, it is to be understood that various changes and modifications may be made without departing from the spirit and scope of the invention.

What I claim:

In a lamp circuit for a motion picture projector having in operation a driven film having successive images thereon, in combination, a full-wave rectifier having input connections for applying an input alternating current thereto and having a pulsating direct current output having a repetition rate corresponding to the frequency of the input alternating current, the rectifier having output connections, a capacitor and an impedance in series connected across said rectifier output connections, an arc discharge lamp connected across the rectifier connections, a pulse generating circuit having means for generating high voltage pulses and having output connections across which the lamp is connected, a stabilizer impedance in series with the rectifier and connected in series with the lamp between the rectifier and lamp, a switch connected to the first-mentioned impedance and to said capacitor selectively operable to a closed position for shortcircuiting the first-mentioned impedance and connecting the output of said rectifier through said capacitor as an input to the pulse generating circuit to apply a relatively smooth direct current voltage to cause it to generate a pulsed voltage having a magnitude sufficient to initiate an arc discharge within said lamp, the output of the rectifier being applied to the lamp when the pulse voltage is applied thereto, said switch being selectively operable to an open position subsequent to the initiation of said arc discharge to place said first-mentioned impedance in circuit with the lamp and disconnect the pulsating direct current output of the rectifier from the pulse generating circuit thereby to apply solely the pulsating direct current output of the rectifier to the lamp at a sufficient level to maintain the arc discharge and maintain the lamp operative to produce a pulsed light output at a repetition rate corresponding to the frequency of the alternating current input, and the pulsed light outputs being chosen to occur successively at periods corresponding to periods in which successive film images are in position to be projected by the lamp output and dark periods occurring during successive positioning periods in which the film images are positioned for the successive projections.

References Cited in the file of this patent

UNITED STATES PATENTS

| | | |
|---|---|---|
| 2,186,013 | Edgerton | Jan. 9, 1940 |
| 2,242,464 | Githens et al. | May 20, 1941 |
| 2,341,431 | Fairbanks | Feb. 8, 1944 |
| 2,496,102 | McCord | Jan. 31, 1950 |
| 2,499,181 | Downes et al. | Feb. 28, 1950 |
| 2,589,437 | Sabol et al. | Mar. 18, 1952 |
| 2,829,315 | Hoekstra | Apr. 1, 1958 |

OTHER REFERENCES

Shutterless Television Film Projector, by L. C. Downes and G. F. Wiggin, article in January 1949 Electronics, pages 96 to 100.